US008250467B2

United States Patent
Brassell et al.

(10) Patent No.: US 8,250,467 B2
(45) Date of Patent: *Aug. 21, 2012

(54) DERIVING MENU-BASED VOICE MARKUP FROM VISUAL MARKUP

(75) Inventors: Richard K. Brassell, Raleigh, NC (US); Marshall A. Lamb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

This patent is subject to a terminal disclaimer.

(21) Appl. No.: 12/113,635

(22) Filed: May 1, 2008

(65) Prior Publication Data

US 2008/0288854 A1    Nov. 20, 2008

Related U.S. Application Data

(63) Continuation of application No. 10/145,334, filed on May 13, 2002, now Pat. No. 7,406,658.

(51) Int. Cl.
*G06F 17/28* (2006.01)
(52) U.S. Cl. ........ 715/239; 715/202; 715/205; 715/249; 704/2; 704/270; 717/136
(58) Field of Classification Search .................. 715/239, 715/205, 248, 249, 259, 202; 704/1, 2; 717/136
See application file for complete search history.

(56) References Cited

U.S. PATENT DOCUMENTS

| 6,715,129 B1 * | 3/2004 | Hind et al. | 715/239 |
| 6,978,316 B2 * | 12/2005 | Ghaffar et al. | 709/246 |
| 2001/0037405 A1 | 11/2001 | Sideek | 709/246 |
| 2002/0003547 A1 | 1/2002 | Wang et al. | 345/727 |
| 2002/0007379 A1 * | 1/2002 | Wang et al. | 707/515 |
| 2004/0205614 A1 * | 10/2004 | Keswa | 715/523 |

OTHER PUBLICATIONS

S.G. Hild, et al., Application Hosting for Pervasive Computing, *IBM Systems Journal*, vol. 40, No. 1, pp. 193-219, (2001).
J. Freire, et al., Web Views: Accessing Personalized Web Content and Services, <http://www10.org/cdrom/papers/220/paperhtm.html>, (Apr. 4, 2002).
M. Brown, et al., Web Page Analysis for Voice Browsing, *Proceedings of the 1st Intl. Workshop on Web Document Analysis (WDA2001)*, pp. 59-61, (Sep. 8, 2001).

* cited by examiner

*Primary Examiner* — Tadeese Hailu
(74) *Attorney, Agent, or Firm* — Steven M. Greenberg, Esq.; Carey, Rodriguez, Greenberg & O'Keefe

(57) ABSTRACT

A visual markup to voice markup transcoding system, method and machine readable storage. The basic method can include identifying at least one heading in visual markup; creating a corresponding menu item in voice markup; further creating a text block in the voice markup for text associated with the identified heading; and, linking the text block with the menu item in the voice markup. Additional headings can be identified in the visual markup; and, each of the creating, further creating and linking steps can be repeated for each identified additional heading. Notably, the visual markup can be formatted according to the hypertext markup language (HTML), and the voice markup is formatted according to the voice extensible markup language (VXML).

4 Claims, 3 Drawing Sheets

DERIVING MENU-BASED VOICE MARKUP FROM VISUAL MARKUP

CROSS-REFERENCE TO RELATED APPLICATIONS

This application is a Continuation of U.S. application Ser. No. 10/145,334, filed on May 13, 2002, which is incorporated herein by reference in its entirety.

BACKGROUND OF THE INVENTION

1. Statement of the Technical Field

The present invention relates to markup transcoding and more particularly to transcoding visual markup into voice markup.

2. Description of the Related Art

The graphical user interface (GUI) transformed modern computing by providing a man-machine interface which could facilitate computer-human interactions regardless of the expertise of the end user. In consequence, visually accessible applications, including Web browsers, have provided a vehicle through which vast quantities of data can be presented and randomly digested by end-users. Vocally accessible applications, by comparison, have not experienced the same accelerated growth. Specifically, the physical limitations of the audio user interface (AUI) inhibit the comprehension of data which has not been presented in sequence. Rather, most voice applications are limited to the serial presentation data.

Traditional voice applications have incorporated an AUI based upon a menu-structure. These traditional voice applications more often than not provide static data from a fixed hierarchical menu format. Though difficult to program, once implemented the traditional voice application can be quite effective, though limited merely to static data. To enjoy the same advantages of visually accessible applications, however, voice applications ought to capitalize on data which can be captured from a variety of dynamically changing data sources, including those data sources disposed about the Internet.

Unlike the case of those voice applications which incorporate strictly static data, however, in the case of voice applications which incorporate dynamic data, the traditional fixed menu structure can prove problematic. Moreover, even when dynamic data is incorporated in a menu-based scheme, the dynamic data typically is authored directly from the data source into voice application markup, for instance using VoiceXML. Clearly, the cost of ownership of such an application proportionally relates to the maintenance of a link between the data source and the voice markup.

To facilitate the maintenance of dynamically changing data source links, transcoding processes both have been proposed and implemented, as is described in Michael K. Brown, Stephen C. Glinski, Brian C. Schmult, Web Page Analysis for Voice Browsing (2000). In a conventional transcoding process, a set of rules can be applied to a source document, each rule facilitating the transformation of markup from one format to another. For example, in a conventional transcoding process, hypertext markup language can be converted to VoiceXML. In particular, as described both in United States Patent Application Publication No. US 2001/0037405 A1 and also in United States Patent Application Publication No. US 2002/0007379 A1, elements in an HTML document can be matched to corresponding elements in the target wireless markup language (WML) document.

Though transcoding can be an effective technology for routinely transforming ordinary content from one type of markup formatting to another, transcoding in of itself cannot resolve the problem of effectively presenting randomly positioned content in a visual application within the menu-based structure of an AUI in a vocally accessible application. More particularly, Web pages typically are two-dimensional and graphically oriented. Web pages capitalize on the ability of the human eye to access data randomly on in a visual document using graphical cues such as image, color and tabular layout to attract attention.

The random placement of content in an AUI, however, does not lend itself well to the listener who must digest data sequentially as it is read, not randomly as the eye perceives the content. In particular, the relatively short attention span of the average end-user, when combined with the inability of the end-user to quickly re-scan input in a voice application menu structure can inhibit the retention of audibly comprehensible content. In consequence, what is needed is an improved system and methodology for transcoding visual content into voice content so that the listener can easily navigate to the most pertinent information.

SUMMARY OF THE INVENTION

The present invention overcomes the limitations of conventional visual markup to voice markup transcoding processes and systems and provides a novel and nonobvious system, method and machine readable storage in which visual content can be hierarchically arranged in a menu format in voice content in order to facilitate the comprehension of the voice markup by end-users. In accordance with a basic aspect of the present invention, a transcoding method can include identifying at least one heading in visual markup; creating a corresponding menu item in voice markup; further creating a text block in the voice markup for text associated with the identified heading; and, linking the text block with the menu item in the voice markup. Additional headings can be identified in the visual markup; and, each of the creating, further creating and linking steps can be repeated for each identified additional heading. Notably, the visual markup can be formatted according to the hypertext markup language (HTML), and the voice markup is formatted according to the voice extensible markup language (VXML).

In another, more complex aspect of the present invention, a transcoding method, can include the steps of: identifying a primary heading in visual markup and at least one subheading associated with the primary heading, and creating both a primary menu item in voice markup which corresponds to the primary heading and also for each identified subheading creating a sub-menu item in the voice markup. For each identified subheading, a text block can be further created in the voice markup for text associated with each the identified subheading. Finally, both the primary menu item can be linked to the sub-menu items in the voice markup, and also the sub-menu items can be linked with the associated text blocks in the voice markup.

Importantly, an additional aspect of the invention can be provided in which the visual markup does not include explicit headings. Rather, merely implicit headings such as comment text can be included in the visual markup. In that case, a transcoding method can include annotating visual markup to convert implicit topical headings to explicit topical headings, and for each explicit topical heading, a corresponding menu item can be created in the voice markup. A text block can be further created in the voice markup for text associated with the identified heading; and, the text block can be linked with the menu item in the voice markup.

A visual markup to voice markup transcoding system can include an annotator configured to convert implicit topical headings in original visual markup to explicit topical headings in converted visual markup. Once converted, the visual markup can be processed in accordance with the other aspects of the present invention. Specifically, a transcoding plug-in to a transcoding publisher can be included with the transcoding system. The transcoding plug-in can both generate menu items in voice markup for identified explicit topical headings in the converted visual markup, and also the transcoding plug-in can link individual text blocks in the voice markup with associated explicit topical headings in the voice markup.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a transcoding process and system in which textual content in visual markup can be organized into a hierarchy of headings and corresponding text. Once organized, the headings can be converted into menu choices in voice markup, which, upon selection, can cause the audible playback of the corresponding text, or alternatively, the audible playback of an additional set of menu choices. In this way, an improved transcoding approach can be provided in which visual content can be transcoded into voice content so that listeners can easily navigate to the most pertinent information in the voice content.

Figure 1:
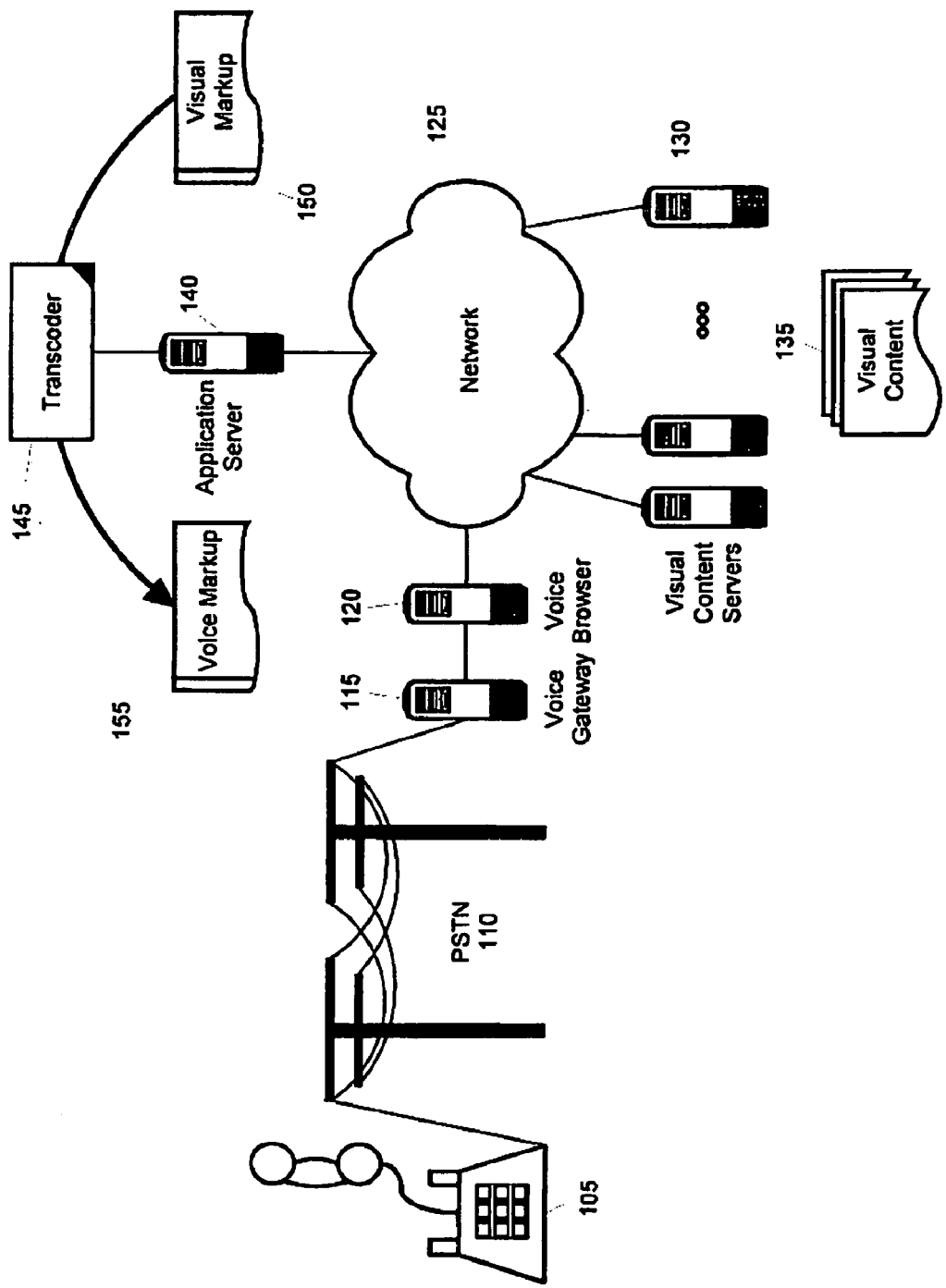
FIG. 1 is a schematic illustration of a system for providing voice access to Web content using a transcoder which has been configured in accordance with the inventive arrangements.

FIG. 1 is a schematic illustration of a system for providing voice access to Web content using a transcoder which has been configured in accordance with the inventive arrangements. The system can include a voice browser 120 through which voice requests for content can be serviced with audible responses. End-users can access the voice browser 120 through conventional audio means, for example a telephone device 105 over a PSTN 110. As the communication medium of the PSTN differs from data communications networks such as the data communications network 125, a voice gateway 115 can be provided to convert PSTN data to a format compatible with the packet orientation of the data communications network 125.

Requests can be received from the PSTN 110 in the voice browser 120 and can be serviced with requests for voice markup provided by the application server 140. Ordinarily, the application server 140 can provide voice content directly in response to a request for voice content. The application server 140, however, can be configured with a transcoder 145 with which visual markup 150 obtained from the visual content stores 135 of visual content servers 130 can be transformed into voice markup 155 which can be processed by the voice browser 120. Notably, the invention is not limited strictly to the use of an application server 140. Rather, in alternative embodiments, a network proxy can suffice in lieu of the application server 140.

Notwithstanding, though FIG. 1 illustrates a particular configuration for providing transcoded voice markup to end-users over a PSTN, the invention is not so limited to any particular configuration. Rather, other configurations can equally suffice, for example a configuration where the voice gateway can be combined with the voice browser, or where a network proxy can be provided in lieu of the application server. As one skilled in the art will recognize, the invention merely requires a transoder in which visual markup can be converted to voice markup in accordance with the inventive arrangements.

Figure 2:
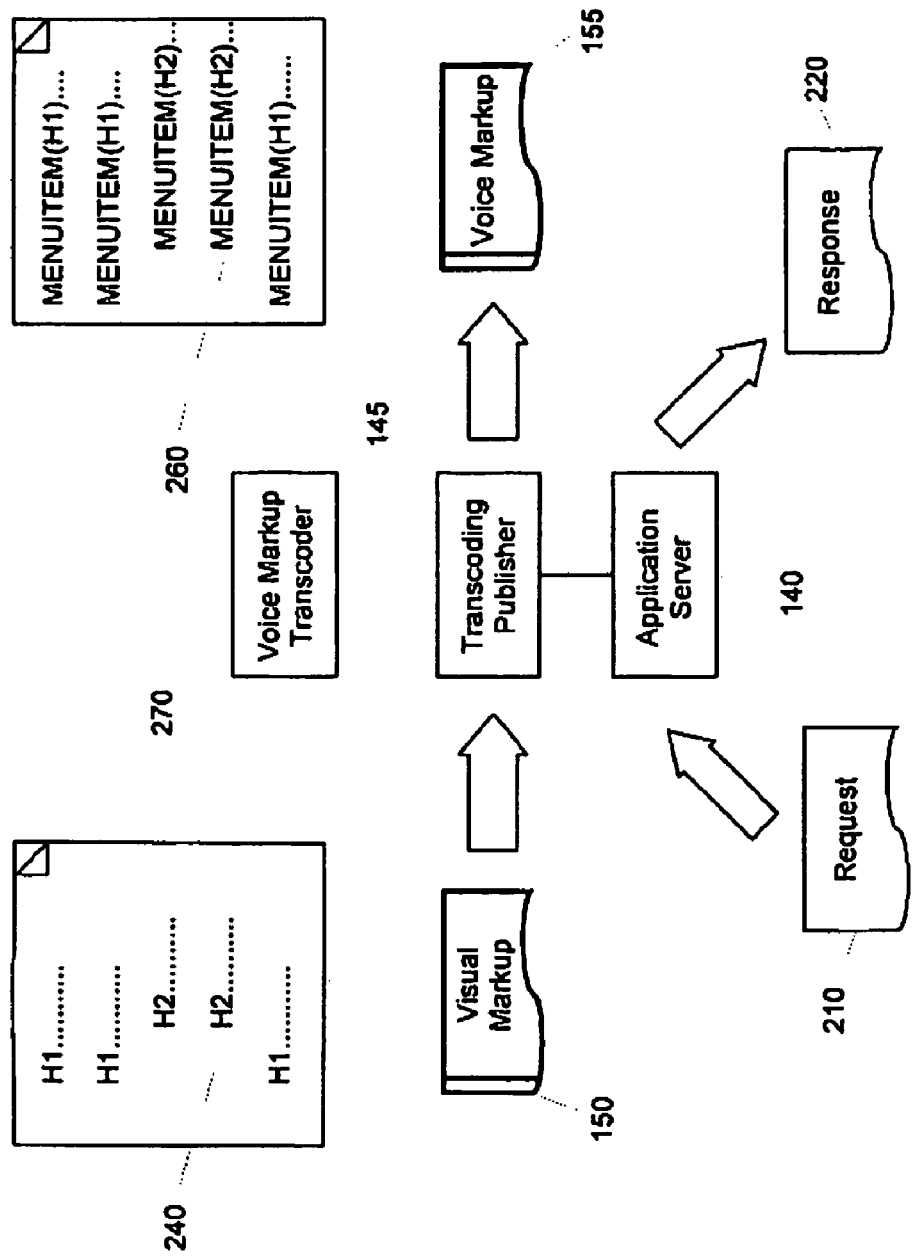
FIG. 2 is a block diagram illustrating the transcoding process performed in the system of FIG. 1; and, FIG. 3 is a flow chart illustrating a transcoding process in which Web content can be hierarchically structured in accordance with a particular aspect of the present invention.

FIG. 2 is a block diagram illustrating the transcoding process performed in the system of FIG. 1. In accordance with the inventive arrangements, a transcoding publisher 145 can be provided in which transcoded content can be served to requesting entities about a computer communications network. A voice markup transcoding plug-in 270 can be provided in conjunction with the transcoding publisher 145. The voice markup transcoding plug-in 270 can be particularly configured to transcode visual markup 150 into voice markup 155. Though the invention is not to be so limited, the visual markup 150 can include any content formatted according to the semantics of a visual markup language such as HTML, XML, WML and the like. Similarly, the voice markup 155 can be any content formatted according to the semantics of an audible markup language such as VXML.

In operation, a request 210 for voice content 260 can be received in an application server 140, though a content server can suffice in lieu of the application server 140. Upon receiving the request, the application server 140 can retrieve the requested voice content 260 and can serve the requested voice content 260 to the requesting entity. Still, where the requested content is visual content 240 and not voice content 260, the application server 140 can provide the visual content 240 to the transcoder 270.

The transcoder 270 can parse the visual markup 240 and can transform the parsed content into voice markup 260. For example, as shown in Appendix A, an HTML document can be parsed according to its constituent tags and converted into corresponding elements of voice markup shown in Appendix B. In particular, heading elements, such as those elements denoted by the "H" tag in HTML, can be identified in the visual markup 240 and converted into a set of menu items in the voice markup 260. Each menu item associated with a heading can be linked to a voice block containing the text which corresponds to the heading. Thus, when processing the voice markup 260, a voice browser can present a selection of the menu items responsive to which an end-user can choose to listen to an audible presentation only of that text associated with a selected menu item.

Notably, the invention is not limited merely the structuring of all headings in a single menu. Rather, in accordance with a preferred aspect of the present invention, different levels of headings in the visual markup 240 can be structured into a hierarchy of headings and corresponding menu items. Specifically, as will be apparent from a review of the HTML markup of Appendix C, a hierarchy of headings can be included in the visual markup 240, including HTML headings H1, H2 and H3. During the transcoding process, the headings and corresponding text can be ordered into parent child relationship with headings both higher and lower in the hierarchy. Subsequently, the hierarchy of headings can be transformed into a hierarchy of menu items in the voice markup 260 as will be apparent from Appendix D.

Figure 3:
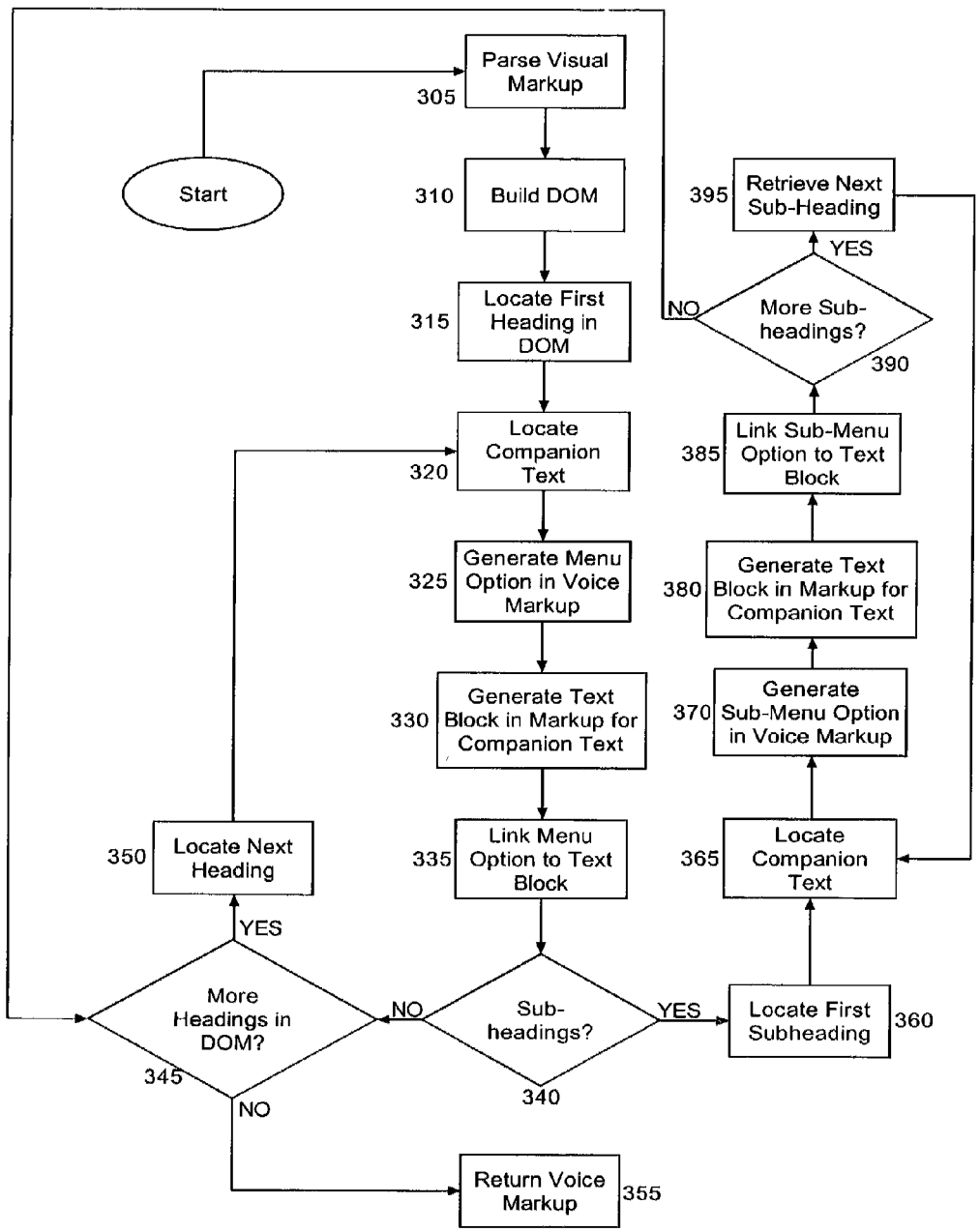

FIG. 3 is a flow chart illustrating an exemplary yet non-exclusive transcoding process in which Web content can be hierarchically structured in accordance with a particular aspect of the present invention. Beginning in block 305, visual markup can be parsed. During the parsing process, in block 310, the visual markup can be organized into a document object model (DOM) as is well known in the art. In block 315, a first primary heading can be identified, such as an HTML H1 heading, and in block 320, any companion text can be located, as well.

In block 325, a menu item can be generated in voice markup for the identified primary heading. Furthermore, in block 330, a text block can be created for the companion text, if any. In block 335, the text block can be linked to the menu item so that, upon processing the voice markup, the vocalization of the menu item can result in the audio playback of the companion text. In order to accommodate a hierarchy of headings, in decision block 340 it can be determined whether the primary heading includes any subheadings. If not, in decision block 345, it can be determined whether any further primary headings can be identified. If so, in block 350 the next primary heading can be retrieved and the process can repeat in blocks 320 through 345. Otherwise, in block 355 the voice markup can be returned to the requesting process.

If, in decision block 340 it is determined that the primary heading includes one or more subheadings, the process can continue through the sub-menu creation process of blocks 360 through 395. Specifically, in block 360 a first sub-heading can be located and in block 365 any companion text can be located, as well. In block 370, a sub-menu item can be generated in voice markup for the identified subheading. Furthermore, in block 375, a text block can be created for the companion text, if any. In block 380, the text block can be linked to the sub-menu item so that, upon processing the voice markup, the vocalization of the sub-menu item can result in the audio playback of the companion text.

In decision block 390, it can be determined whether any further subheadings can be located for the primary subheading. If so, in block 395 the next subheading can be retrieved and the process can continue through the sub-menu creation process of blocks 360 through 395. Otherwise, the process can continue to the decision block 345 in which any further primary headings in the DOM can be identified. Notably, though the process illustrated in FIG. 3 is limited merely to a primary and secondary subheading hierarchy, the invention as a whole is not so limited. Rather, as one skilled in the art will recognize, the process of FIG. 3 can be easily extended to accommodate multiple tiers of subheadings and corresponding sub-menus in order to facilitate the vocal navigation of visual content.

Importantly, as will be recognized from the visual markup of Appendix E, not all visual markup will contain explicit heading tags as in the case of the visual markup of Appendices A and C. Rather, in some circumstances, the hierarchical structure of visual content can be inferred from other markup tags. For instance, as shown in the visual markup of Appendix E, the hierarchy of topics in the visual markup can be expressed by comment tags, rather than heading tags. In this case, the visual markup first can be pre-processed so that the inferred headings are explicitly re-tagged as headings.

To accomplish this pre-processing, an annotation editor can be employed to convert the implicit headings into explicit headings. Moreover, the annotation editor can be employed to hierarchically structure the explicit headings. Specifically, what can be inferred as primary headings can be re-labeled with HTML H1 tags, while secondary headings can be re-labeled with HTML H2 tags and tertiary headings can be re-labeled with HTML H3 tags. Instructions for suitably annotating the visual markup can be maintained in a separate document, referred to in the art as an annotator.

In that regard, Appendix F illustrates an exemplary annotator for the visual markup of Appendix E. As will be recognized by one skilled in the art, annotators can be specified using an XML dialect wherein each annotation instruction specifies an action such as "keep", "remove", "replace", and a location for the action. Locations typically are expressed using XPath expressions, as is well known in the art. In consequence, topical hierarchies implicitly defined by visual content can be in explicitly defined prior to transcoding the explicitly defined hierarchy into voice content.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A visual markup to voice markup transcoding hardware system comprising:
 a hardware processor configured to include:
 an annotator configured to convert implicit topical headings in original visual markup to explicit topical headings in converted visual markup; and,
 a transcoding plug-in to a transcoding publisher, said transcoding plug-in having a configuration both for generating menu items in voice markup for identified explicit topical headings in said converted visual markup, and also for linking individual text blocks in said voice markup with associated explicit topical headings in said voice markup, said linking providing a configuration for audio playback of said text blocks responsive to a vocalization of said associated explicit topical headings in said voice markup, wherein
 the implicit topical headings and the explicit topical headings each include at least two different levels of headings.

2. The visual markup to voice markup transcoding system of claim 1, wherein the levels of the explicit topical headings correspond to the levels of the implicit topical headings.

3. The visual markup to voice markup transcoding system of claim 1, wherein the annotator is further configured to identify the implicit topical headings within the original visual markup prior to converting the implicit topical headings into explicit topical headings.

4. The visual markup to voice markup transcoding system of claim 1, wherein said visual markup is formatted according to the hypertext markup language (HTML), and the voice markup is formatted according to the voice extensible markup language (VXML).

* * * * *